Figure 1:
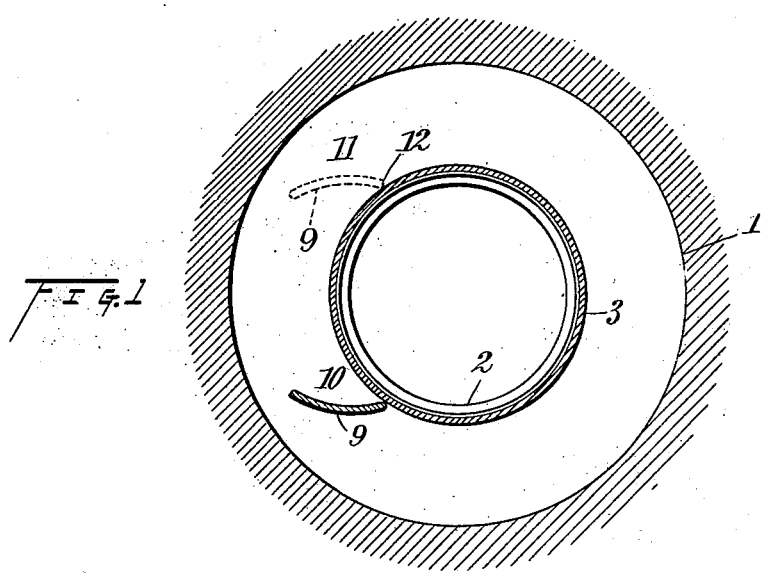

No. 795,508. PATENTED JULY 25, 1905.
J. W. HAYS.
CONCENTERING COUPLING DEVICE FOR PIPE OR CASING SECTIONS.
APPLICATION FILED MAY 5, 1905.

WITNESSES:
John J. Kittle
E. E. Ellis

INVENTOR
James W. Hays
BY
ATTORNEYS

UNITED STATES PATENT OFFICE.

JAMES W. HAYS, OF WOODSFIELD, OHIO.

CONCENTERING COUPLING DEVICE FOR PIPE OR CASING SECTIONS.

No. 795,508.

Specification of Letters Patent.

Patented July 25, 1905.

Application filed May 5, 1905. Serial No. 258,941.

*To all whom it may concern:*

Be it known that I, JAMES W. HAYS, a citizen of the United States, and a resident of Woodsfield, in the county of Monroe and State of Ohio, have invented a new and Improved Concentering Coupling Device for Pipe or Casing Sections, of which the following is a full, clear, and exact description.

This invention relates to means for concentering tubular members when coupling together adjacent ends thereof; and it consists, substantially, in details of construction and combinations of parts hereinafter more particularly described, and pointed out in the claims.

In the withdrawal of the pipe-casings from drilled oil or other wells it frequently happens that after the pipe or casing has been raised or lifted some distance within the well it becomes parted at one or more places, due to the excessive strain produced upon the threaded joints between adjacent ends of the different sections thereof, the lowermost sections being thereby caused to drop back into the well and rendering it extremely difficult to subsequently remove these sections in as short a space of time as is desired. In such accidents or mishaps it is usual in some instances to raise or remove the loose upper section of pipe or casing from the well and apply to the end thereof a threaded (male or female) nipple, which together with the said section is inserted into the well and a connection or coupling of the nipple effected with the upper end of the section of pipe or casing which has remained in the well, so as to enable all of the coupled sections of the pipe or casing to be removed or withdrawn from the well, as was attempted to be effected in the first instance. Considerable difficulty has been encountered in properly centering the inserted nipple with respect to the upper end of the pipe or casing within the well, frequently occasioning the loss of much time as well as the expenditure of considerable effort, all of which is within the knowledge of well-workers and others employed in sections where wells are drilled for the extraction or supply of natural oils from the earth at varying depths thereof.

One of the principal objects of the present invention is to overcome the disadvantages and objections above referred to and to provide means whereby the adjacent ends of pipe-sections to be coupled together may be concentered with relation to each other, thereby enabling the two sections of pipe to be quickly joined together for use for various purposes in the arts.

The above and additional objects are attained by means substantially such as are illustrated in the accompanying drawings, forming a part of this specification, in which similar characters of reference indicate corresponding parts in all the views.

Figure 2:
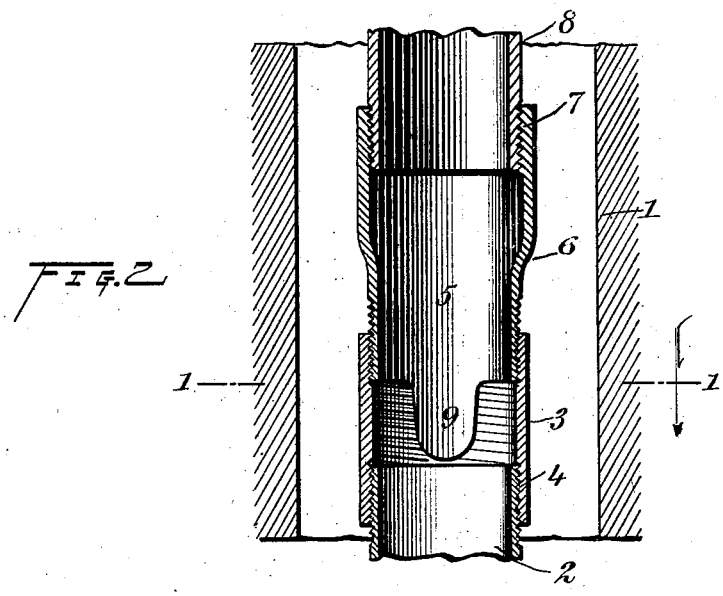

Figure 1 is a sectional plan view on the line 1 1 of Fig. 2, illustrating the manner in which the concentering of the two adjacent ends of pipe or casing sections may be established in the event of improper insertion of the concentering device within an oil or other well in the first instance. Fig. 2 is a vertical sectional view illustrating my improved concentering device more clearly, and Fig. 3 is a bottom plan view of the central structure shown in Fig. 2.

Before proceeding with a more detailed description it may be stated that in the form of my improvements herein shown I employ a tubular concentering device or element of special construction, the same having means at one of its extremities for the attachment thereto of the end of a pipe or casing section, and is also provided with means at its other extremity by which a fastening of this extremity may be effected with either an adjacent end of another pipe or casing section or a coupling thereon. The said concentering device or element is provided with special means for effecting concentered relations between the parts connected or joined thereby, and while I have herein represented my improvements in a certain preferred embodiment it will be understood that I am not limited thereto in precise detail, since immaterial changes therein may be made coming within the scope of my invention.

Reference being had to the drawings by the designating characters marked thereon, 1 represents what may be stated to be a section of drilled oil or other well, and 2 represents the upper end portion of a pipe or casing section within the well and which may be said to have previously been attempted to be lifted from the well with other superposed sections connected therewith, but which has fallen back into the well after having become parted from the section with which it was immediately joined by means of some form of coupling-sleeve—such, for instance, as indicated at 3—the lower inner portion of this sleeve being internally threaded at 4 to fit a corresponding external thread formed on the said pipe-section 2. In the upper end portion of the sleeve is fitted my improved concentering device 5, threaded externally to fit the internal thread of the sleeve or joined thereto in any other manner, the said concentering device being preferably swelled or enlarged circumferentially at 6 and having fitted to its upper extremity at 7 the lower end of a pipe or casing section 8, which, let it be said, has been lowered into the well (with the said concentering device) for the purpose of effecting the joinder of the concentering device with the said coupling-sleeve 3. The concentering device is formed at one side of the lower end thereof with a prolongation or extension 9 of suitable length and which is formed transversely on a curve corresponding to the arc or segment of the circle on which the said lower end of the concentering device is formed that the concentered relation between the pipe or casing section may be the more readily effected, it being understood that it is necessary that the prolongation or extension 9 be inserted interiorly of the coupling-sleeve 3 to properly guide the lower end of the device 5 in place by the movement of the outer surface of the prolongation or extension against the inner surface of the said coupling-sleeve 3.

Figure 3:
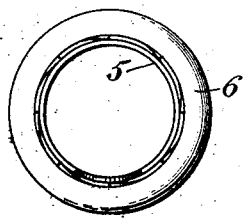

In the use of my improved concentering device should the same be lowered within the well 1 in such manner as to bring the prolongation or extension 9 thereof externally of the coupling-sleeve 3—as, for instance, in the position indicated at 10 in Fig. 3—the operator will be apprised of this fact on a slight turning of the pipe or casing section 8 until the position of the prolongation or extension 9 has been reversed to that shown in dotted lines at 11 in Fig. 1, since the edge 12 of the prolongation or extension will then strike against the outer surface of the coupling-sleeve 3 and offer resistance to further turning of the concentering device. On this discovery being made the operator simply raises the concentering device by means of the pipe or casing section 8 until the lower edge of the former has been brought clear of the upper edge of the coupling-sleeve 3, whereupon the prolongation or extension may be carried inwardly of the said coupling-sleeve and the proper connection then effected between the latter and the concentering device in an obvious manner.

From the foregoing it is thought the construction and operation of my improved concentering device for pipe or casing sections will be thoroughly understood, and it is apparent, of course, that the same may be embodied in forms differing from that herein shown and described. I have herein illustrated the said device as being enlarged or swelled at 6; but this particular feature of construction is not essential to the device in all instances, it being also apparent that the diameter of the device may be equal throughout, both internally and externally.

Having thus described my invention, I claim as new and desire to secure by Letters Patent—

1. A device for concentering pipe or casing sections for coupling purposes comprising a tubular structure provided, at the extremities thereof, with means for connecting the same with the adjacent ends of said sections, said device being provided, at one side, at an end thereof, with a longitudinal extension.

2. A device for concentering pipe or casing sections for coupling purposes comprising a tubular structure provided, at the extremities thereof, with means for connecting the same with the adjacent ends of said sections, said device being provided, at one side, at an end thereof, with a longitudinal extension formed concentrically with the said tubular structure.

3. A device for concentering pipe or casing sections for coupling purposes comprising a tubular structure provided, at the extremities thereof, with means for connecting the same with the adjacent ends of said sections, said device being provided, at one side, at an end thereof, with a longitudinal extension formed transversely on an arc of the circle on which said tubular structure is formed.

4. A device for concentering pipe or casing sections for coupling purposes comprising a tubular structure threaded at the extremities thereof for connecting the same with adjacent threaded ends of said sections, said device being provided, at one side, at an end thereof, with a longitudinal extension.

In testimony whereof I have signed my name to this specification in the presence of two subscribing witnesses.

JAMES W. HAYS.

Witnesses:
FRANK S. HAIRE,
W. H. MOSELEY.